(12) United States Patent
Mojem et al.

(10) Patent No.: US 10,077,719 B2
(45) Date of Patent: Sep. 18, 2018

(54) DEVICE AND METHOD FOR BLEEDING COMPRESSOR AIR IN A TURBOFAN ENGINE

(71) Applicant: Rolls-Royce Deutschland Ltd & Co KG, Blankenfelde-Mahlow (DE)

(72) Inventors: Mats Mojem, Berlin (DE); Andreas Scholz, Berlin (DE)

(73) Assignee: Rolls-Royce Deutschland Ltd & Co KG, Blankenfelde-Mahlow (DE)

(*) Notice: Subject to any disclaimer, the term of this patent is extended or adjusted under 35 U.S.C. 154(b) by 1255 days.

(21) Appl. No.: 14/179,980

(22) Filed: Feb. 13, 2014

(65) Prior Publication Data

US 2014/0234080 A1 Aug. 21, 2014

(30) Foreign Application Priority Data

Feb. 20, 2013 (DE) .................. 10 2013 202 786

(51) Int. Cl.
*F02C 9/18* (2006.01)

(52) U.S. Cl.
CPC ..................... *F02C 9/18* (2013.01)

(58) Field of Classification Search
CPC ............ F04D 27/009; F04D 27/0207; F04D 27/0215; F04D 29/40; F04D 15/0011

(Continued)

(56) References Cited

U.S. PATENT DOCUMENTS 3,142,438 A * 7/1964 McKenzie .......... F04D 27/0215
                                                            415/144
4,329,114 A * 5/1982 Johnston ................. F01D 11/24
                                                            415/116

(Continued)

FOREIGN PATENT DOCUMENTS

DE    102011101331      11/2012
EP       1308601 A1      5/2003

(Continued)

OTHER PUBLICATIONS

French Search Report dated Dec. 16, 2016 for counterpart French Application No. FR 1451155.

(Continued)

*Primary Examiner* — Richard Edgar
*Assistant Examiner* — John S Hunter
(74) *Attorney, Agent, or Firm* — Shuttleworth & Ingersoll, PLC; Timothy J. Klima (57) ABSTRACT

A device for bleeding compressor air in a turbofan engine includes a low-pressure compressor of a primary duct, a fan stator arranged in a secondary duct downstream of a fan, and an arrangement for discharging compressor air from the low-pressure compressor into the secondary duct. The arrangement includes air guiding devices to guide compressor air into the secondary duct upstream of the fan stator relative to the flow direction in the secondary duct, past the stator vanes of the fan stator in a separate duct in the axial direction and is only mixed with the air of the secondary duct downstream of the fan stator. The separate duct is formed by a plurality of hollow structures extending in the longitudinal direction each between two adjacent stator vanes of the fan stator, with the hollow structures having a closed circumference in cross-section.

18 Claims, 7 Drawing Sheets

(58) Field of Classification Search
USPC .................................................. 415/144, 145
See application file for complete search history.

(56) References Cited

U.S. PATENT DOCUMENTS

| | | | | |
|---|---|---|---|---|
| 4,900,221 | A * | 2/1990 | Ciokajlo | F01D 25/162 |
| | | | | 415/142 |
| 5,261,228 | A * | 11/1993 | Shuba | F01D 17/105 |
| | | | | 60/226.3 |
| 5,279,109 | A * | 1/1994 | Liu | F02C 7/052 |
| | | | | 60/39.092 |
| 6,622,475 | B2 * | 9/2003 | Brault | F01D 17/105 |
| | | | | 60/226.3 |
| 6,938,407 | B2 | 9/2005 | Beutin et al. | |
| 7,249,929 | B2 * | 7/2007 | Cummings | F01D 17/105 |
| | | | | 29/889.22 |
| 7,785,066 | B2 | 8/2010 | Bil et al. | |
| 8,075,246 | B2 * | 12/2011 | Albert | F01D 17/105 |
| | | | | 415/116 |
| 2007/0196204 | A1 * | 8/2007 | Seitz | F01D 11/08 |
| | | | | 415/144 |
| 2008/0063515 | A1 | 3/2008 | Bil et al. | |
| 2010/0126182 | A1 * | 5/2010 | Hoover | F01D 17/105 |
| | | | | 60/785 |
| 2012/0288359 | A1 | 11/2012 | Pichel | |

FOREIGN PATENT DOCUMENTS

| | | |
|---|---|---|
| FR | 2902142 A1 | 12/2007 |
| FR | 2926328 A1 | 7/2009 |
| FR | 2926337 A1 | 7/2009 |

OTHER PUBLICATIONS

German Search Report dated May 3, 2013 from counterpart German Application No. 10 2013 202 786.9.

* cited by examiner

DEVICE AND METHOD FOR BLEEDING COMPRESSOR AIR IN A TURBOFAN ENGINE

CROSS-REFERENCE TO RELATED APPLICATION

This application claims the benefit of German Patent Application No. DE102013202786.9 filed on Feb. 20, 2013 and is fully incorporated herein by reference.

BACKGROUND

This invention relates to a device and a method for bleeding compressor air in a turbofan engine.

It is known to extract compressor air from a compressor of a turbofan engine, in order to vary the mass flow through the compressor and to optimize the latter in respect of its aerodynamic stability. The bleeding of compressor air represents, for example, one possibility for preventing unstable operating states of a low-pressure compressor. These states can occur, for example, when the maximum mass throughput of a high-pressure compressor of the turbofan engine at low speeds is less than that of the low-pressure compressor. This can lead, when the engine is throttled, to flow retention downstream of the low-pressure compressor and to a possible reversal of the flow direction, so-called "surge".

A device is known from DE 10 2011 101 331 A1 for extracting compressor air from a low-pressure compressor. To do so, the wall of the low-pressure compressor is provided with an opening that issues into an annular duct. The extraction of compressor air can be controlled using a sealing element movable between a closed position and an open position. A device of this type for controllable bleeding of compressor air from a low-pressure compressor is also referred to as a booster bleed valve (BBV) system.

The aim for a turbofan engine must be that the compressor air discharged from the low-pressure compressor is introduced into the secondary flow duct in an area in which the introduction of compressor air in this way does not lead to aerodynamic losses. This risk exists however when the released compressor air is introduced into the secondary flow duct between the fan and the fan stator i.e. in an area in which the air coming from the fan still has a swirl and this swirl has not yet been removed from the flow by the fan stator.

Accordingly, it is provided, for example in US 2008/0063515 A1, that the compressor air released from the low-pressure compressor is guided axially rearwards inside an intermediate casing of the turbofan engine, and not introduced into the secondary flow duct until downstream of the fan stator. This does however have the disadvantage that for the guidance of air inside the turbofan engine in this way, the intermediate casing or other functional components must be adapted in their design, entailing corresponding costs and design effort.

This problem is particularly acute when the fan stator is arranged on the outside of an intermediate casing absorbing structural loads. An intermediate casing of this type absorbing structural loads is also referred to as "IMC" and is used for the attachment of fastening means for suspending the engine from a wing or aircraft fuselage. An intermediate casing of this type is that part of an aircraft engine which is most complex and most time-consuming to manufacture, which is why it is preferably avoided that airflow ducts for the guidance of compressor air are additionally integrated into an intermediate casing of this type.

SUMMARY

An object underlying the present invention is to provide a device for bleeding compressor air inside a turbofan engine which manages without the need for structural changes to functional components of the turbofan engine while at the same time preventing aerodynamic losses.

According to an exemplary embodiment of the invention, in a device for bleeding compressor air that includes a low-pressure compressor of a primary flow duct and a fan stator of a secondary flow duct, air guiding devices such that compressor air to be released from the low-pressure compressor is passed into the secondary flow duct upstream of the fan stator, relative to the flow direction in the secondary flow duct, and is there guided in a separate flow duct past the stator vanes of the fan stator in the axial direction and not mixed with air of the secondary flow duct until it is downstream of the fan stator. Although the compressor air to be released is passed into the secondary flow duct upstream of the fan stator, it is there not yet mixed with the air of the secondary flow duct in order to prevent aerodynamic losses, but instead axially guided in a separate flow duct downstream of the fan stator and only mixed with the air of the secondary flow duct downstream of the fan stator, i.e. in an area in which the swirl has been removed from the flow.

The solution in accordance with the invention prevents aerodynamic losses in that the discharged compressor air is only mixed with the air of the secondary flow duct downstream of the fan stator. At the same time, it avoids the need for structural changes to functional components, in particular to an intermediate casing carrying structural loads, in that the compressor air to be released is passed into the secondary flow duct upstream of the fan stator and hence upstream of such components, so that structural adaptations of these functional components are not required.

Structural adaptations are required only in the secondary flow duct, in order to provide there a separate flow duct which receives the air introduced upstream of the fan stator and guides it past the stator vanes of the fan stator without any mixing with the air of the secondary flow duct already taking place. The structural measures required here can be implemented easily and cost-effectively, so that the solution in accordance with the invention addresses the problem of introducing compressor air of the low-pressure compressor into the secondary flow duct simply and effectively, without or with only minor aerodynamic losses, and without the need for structural changes to functional components, in particular to an intermediate casing.

In accordance with an exemplary embodiment of the invention, it is provided that the fan stator has a hub with a hub surface that delimits the secondary flow duct radially inwards. The separate flow duct passing the compressor air downstream of the fan stator is here designed at least in some sections adjoining or adjacent to the hub surface in the secondary flow duct. The separate flow duct here forms, inside the secondary flow duct, an annular space subdivided into partial ducts in the circumferential direction by the individual stator vanes of the fan stator.

To form the separate flow duct, a cover is furthermore provided in an embodiment of the invention which has a plurality of cover panels arranged radially at a distance from the hub surface. The hub surface here forms a radially inner limitation and the cover panels a radially outer limitation of the separate flow duct. The cover panels consist for example of plastic and can be inexpensively made as injection-molded parts. As a general principle, however, the cover panels can also be made of another material.

The individual cover panels together forming the radially outer cover of the separate flow duct each extend in one embodiment between two adjacent stator vanes of the fan stator, with the stator vanes providing a subdivision of the separate flow duct into partial ducts in the circumferential direction. It can be provided here that two adjacent cover panels are directly in contact with the stator vanes and directly with one another upstream and downstream of the stator vanes, so that the compressor air can exit the separate flow duct either not at all or only to a negligible extent.

A further exemplary embodiment provides that the cover panels each have at least one supporting web extending perpendicularly in the direction of the hub and braced against the latter. The cover panels are in this embodiment designed with T-shaped or approximately T-shaped cross-section. In this embodiment too, design in the form of an injection-molded part is possible.

In an alternative embodiment, the separate flow duct is formed by a plurality of hollow structures extending in the longitudinal direction and each running in the circumferential direction between two adjacent stator vanes of the fan stator. The hollow structures have a closed circumference in their cross-section. The cross-section is for example rectangular or approximately rectangular. In this embodiment, a limitation of the separate flow duct is not provided by the hub surface of the fan stator, instead the entire separate flow duct is formed by a plurality of hollow structures extending in the axial direction, i.e. in the flow direction. The hollow structures are however arranged here such that they directly adjoin the hub area of the fan stator.

In an exemplary embodiment of the invention, it is provided that the separate flow duct extends in the axial direction over a length dimensioned such that the axially rear end of the separate flow duct ends at a distance of at least 10% relative to the profile chord of the fan stator downstream of the axial trailing edge of the fan stator. In further embodiments, this distance is at least 30% or at least 60% relative to the length of the profile chord of the fan stator.

A further exemplary embodiment of the invention provides that the separate flow duct is prolonged at its axially rear end such that the compressor air is blown into the secondary flow duct at a small angle relative to the axial flow direction inside the secondary flow duct. This prevents heavy swirling and flow losses.

To achieve this blowing of the compressor air into the secondary flow duct in a manner as far as possible tangential, the invention provides in an embodiment that the radially inner limitation of the separate flow duct extends downstream of the fan stator in the axial direction further than the radially outer limitation of the separate flow duct. This results in a projecting portion of the radially inner limitation of the separate flow duct. The latter has in the embodiment under consideration a slight curvature in the direction of the secondary flow duct, so that air flowing in the axial direction inside the separate flow duct is guided gently and without swirling in the direction of the secondary flow duct. At the same time, the projecting portion in one embodiment runs out at its end tangentially to the flow direction in the secondary flow duct in order to avoid swirling. In this way, flow losses that would occur at abrupt transitions, are avoided.

As already mentioned, the fan stator can be arranged on the outside of an intermediate casing of the turbofan engine that absorbs structural loads. The present invention is however by no means restricted to this. The fan stator can also be arranged at another location in the secondary flow duct of the turbofan engine.

It can furthermore be provided that the fan stator itself is designed such that it is suitable for bearing structural loads. In this case, the fan stator performs, in addition to its aerodynamic function, the further function of transmitting structural loads of the engine to a fastening structure for fastening of the engine to a wing or an aircraft fuselage. A structural embodiment of this type for the fan stator can be provided in particular when the tan stator is arranged on an intermediate casing absorbing structural loads.

It is however also possible to design the fan stator such that it is not suitable for bearing structural loads, thus performing only an aerodynamic function. For this case, it is provided that struts are additionally arranged downstream of the fan stator in the secondary flow duct and are designed to carry the stated structural loads. These struts are for example connected to an intermediate casing absorbing structural loads.

In an exemplary embodiment of the invention, it is provided that the compressor air is extracted from the low-pressure compressor downstream or in the final stage of the latter. To extract the compressor air, the device in accordance with the invention may include air guiding devices such that compressor air from the low-pressure compressor is discharged in a substantially radial direction and introduced upstream of the fan stator into the separate flow duct. The discharge of compressor air out of the main flow duct of the low-pressure compressor can as a general principle be achieved in a variety of ways, for example as described in DE 10 2011 101 331 A1. The air can here be discharged in separate ducts in the radial direction and supplied to the separate flow duct that runs in the axial direction.

The invention also relates to a method for bleeding/releasing compressor air in a turbofan engine. It is provided here in accordance with the invention that the compressor air is introduced into the secondary flow duct upstream of a fan stator of said secondary flow duct relative to the flow direction in the latter, guided past the stator vanes of the fan stator in the secondary flow duct in a separate flow duct in the axial direction, and only mixed with the air of the secondary flow duct downstream of the fan stator. In an exemplary embodiment, the compressor air is here guided in the separate flow duct adjoining a radially inner hub surface of the fan stator.

BRIEF DESCRIPTION OF THE DRAWINGS

The present invention is described in the following with reference to the figures of the accompanying drawing showing several exemplary embodiments.

DETAILED DESCRIPTION

Figure 9:
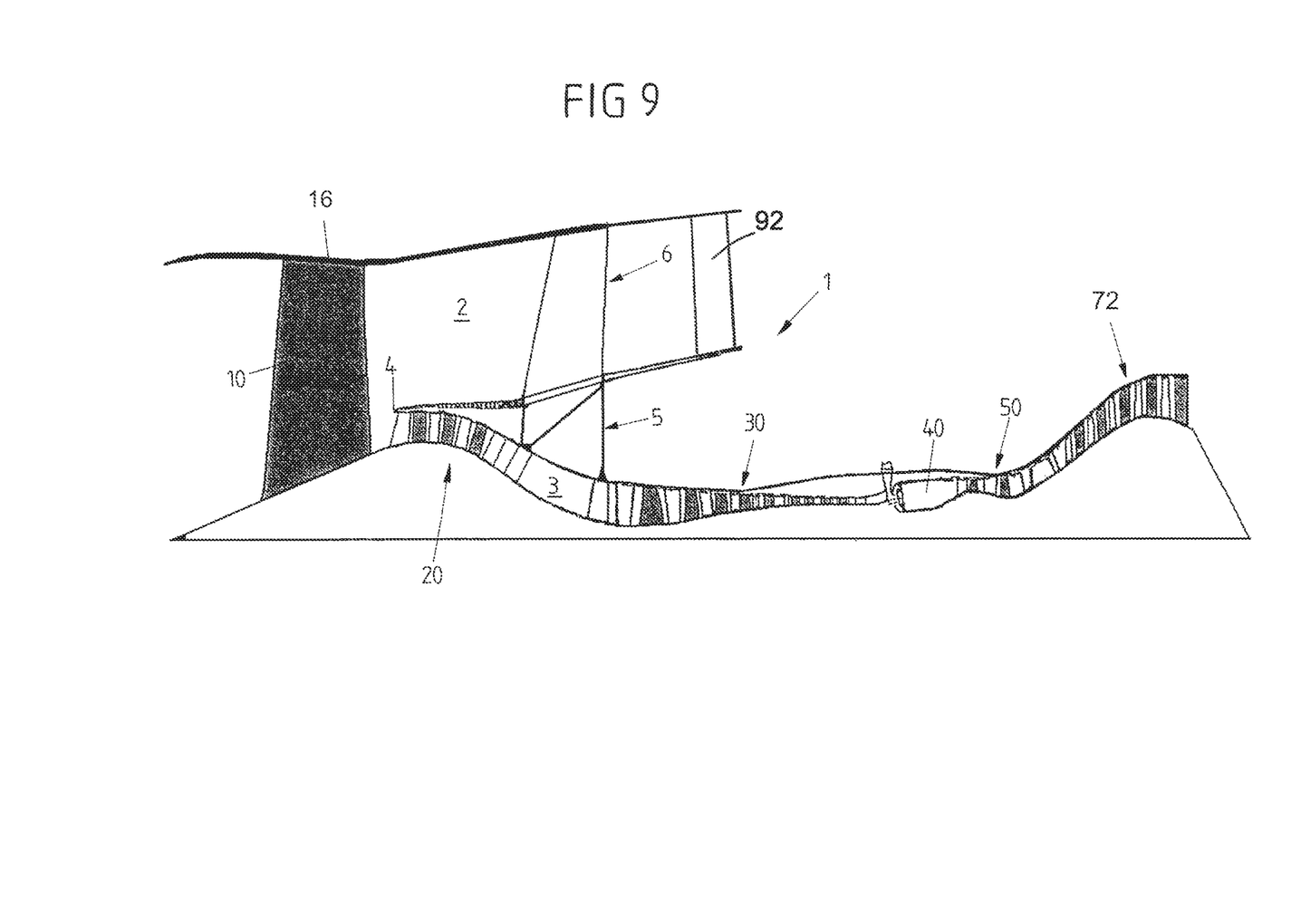
FIG. 9 shows an exemplary embodiment of a jet engine, into which a device for bleeding compressor air in accordance with the present invention can be integrated.

FIG. 9 shows an exemplary embodiment of a turbofan engine 1, also called a dual-flow jet engine, and including a primary flow duct 3 and a secondary flow duct 2. The primary flow duct 3 and the secondary flow duct 2 are separated from one another starting from a splitter 4 downstream of a fan stage with a fan 10. The primary flow duct 3 passes through the core engine.

Downstream of the fan 10 and inside the secondary flow duct 2 is a fan stator 6, which performs the function of again removing the swirl imparted to the flow by the fan 10.

The core engine includes in the exemplary embodiment of a two-shaft engine shown, a low-pressure compressor 20, a high-pressure compressor 30, a combustion chamber 40, a high-pressure turbine 50 and a low-pressure turbine 72. The low-pressure compressor 20 and the high-pressure compressor 30 each have a plurality of compressor stages, each including a rotor stage and a stator stage.

The fan stage has a fan casing 16 which has on the inside an inner surface that delimits radially outwards the secondary flow duct of the jet engine 1. The low-pressure compressor 20 and the high-pressure compressor 30 are surrounded by a circumferential casing that delimits radially outwards the primary flow duct 3. The primary flow duct 3 is formed radially inwards by appropriate ring surfaces of the rotors and stators of the respective compressor stages or by the hub or by elements of the appropriate drive shaft connected to the hub.

It is further pointed out that the turbofan engine shown in FIG. 9 has an intermediate casing 5 designed to absorb structural loads and also referred to as structural intermediate casing. In the exemplary embodiment in FIG. 9, the fan stator 6 is connected to the intermediate casing 5 on its outside, although this is not necessarily so. The fan stator 6 includes a plurality of stator vanes which extend in the radial direction between the hub of the fan rotor and the fan casing 16.

In the context of the present invention, a device for bleeding compressor air from the low-pressure compressor 20 into the secondary flow duct 2 is important.

Figure 1:
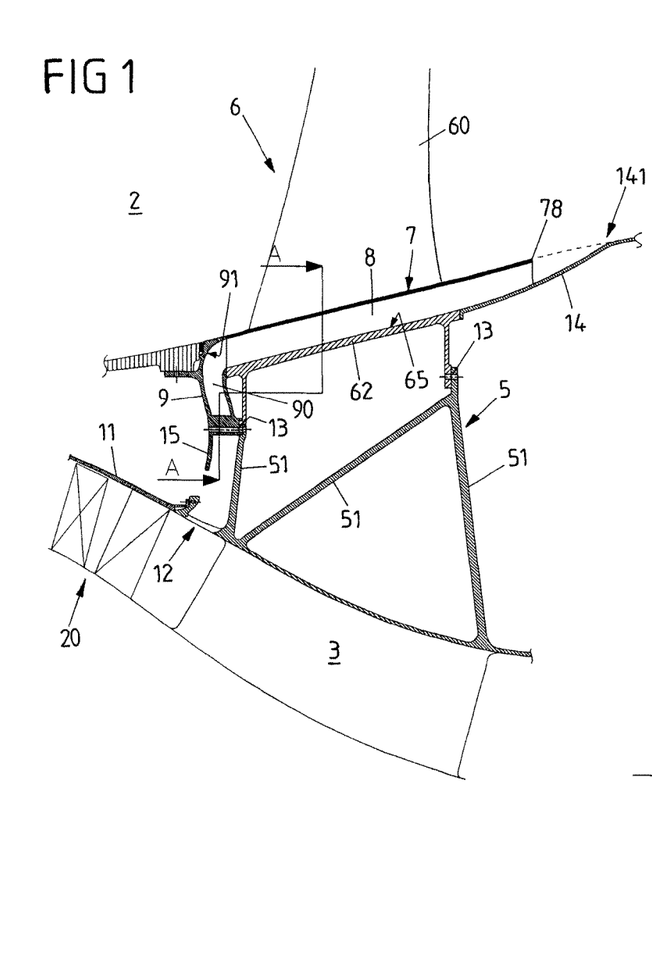
FIG. 1 shows in sectional view a first exemplary embodiment of a device for bleeding compressor air, with a separate flow duct for the compressor air being provided in a secondary flow duct.

FIG. 1 shows a first exemplary embodiment of a device for bleeding compressor air inside a turbofan engine. The device is formed by some of the components of the turbofan engine, and includes a low-pressure compressor 20, corresponding to the low-pressure compressor 20 of FIG. 9, and a fan stator 6. The low-pressure compressor 20 has a plurality of compressor stages each including a rotor stage and a stator stage. The low-pressure compressor 20 is located in the primary flow duct 3 of the turbofan engine.

The fan stator 6 is arranged in the secondary flow duct 2 of the turbofan engine. It has a plurality of stator vanes 60 arranged next to one another in the circumferential direction. The fan stator 6 is delimited radially inwards by a hub 62 forming a hub surface 65 facing the secondary flow duct 2. The fan stator 6 is, in the exemplary embodiment shown, however not necessarily so, fastened using bolt connections 13 to the outside of an intermediate casing 5 having a plurality of struts 51 connected to one another, for example made of titanium, and being designed to absorb structural loads of the turbofan engine. In particular, the intermediate casing 5 is used for connecting the turbofan engine to a wing or to an aircraft fuselage using fastening means for fastening the turbofan engine. It is also possible to design the fan stator 6 such that it is not suitable for bearing structural loads, thus performing only an aerodynamic function. For this case, it is provided that struts 92 (FIG. 9) are additionally arranged downstream of the fan stator 6 in the secondary flow duct 2 and are designed to carry the stated structural loads. These struts 92 are for example connected to an intermediate casing 5 absorbing structural loads.

The device in accordance with the invention as shown in FIG. 1 furthermore includes an arrangement by means of which compressor air to be released from the low-pressure compressor 20 can be introduced into the secondary flow duct 2 provided that the current operating conditions permit this type of discharge of compressor air. This arrangement includes a release opening 12, guiding devices which guide the tapped compressor air radially outwards upstream of the intermediate casing 5, and guiding devices forming a separate duct inside the secondary flow duct 2 and used to guide the released compressor air past the stators vanes 60 of the fan stator 6 and only mix it with the air of the secondary flow duct 2 downstream of the fan stator 6.

The release opening 12 is provided in a wall 11 of a casing of the low-pressure compressor 20. The release opening 12 is assigned a sealing element, not shown in detail, which is movable between a closed position and an open position and whose operation controls whether and to what extent compressor air is released from the low-pressure compressor 20. These controllable closures are known per se, with reference being made to DE 10 2011 101 331 A1 as an example.

The guiding devices for guiding released compressor air in the radial direction and also in the axial direction upstream of the intermediate casing 5 can, generally speaking, be designed in any way. The design can include one or more closed or open ducts and associated guiding elements. These guiding devices can be formed by structural components that are already present, since the air released from the compressor 20 flows radially outwards in the direction of the secondary flow duct 2 due to the pressure difference between the primary flow duct 3 and the secondary flow duct 2.

In the embodiment shown in FIG. 1, separate air guiding devices 15, 9 are provided that include chutes 15 which guide the air released from the compressor 20 outwards in the radial direction, and a radial air guiding device 9. The latter has a flow duct 90, into which the released air is introduced. The radial air guiding device 9 is also connected to the intermediate casing 5 using a bolt connection 13. The flow duct 90 extending in the radial direction has at its radially outer end a curvature 91 along which the radially flowing compressor air is diverted in the axial direction and blown into a further separate flow duct 8.

It should be noted here that the radially outer end of the air guiding device 9 is in the secondary flow duct 2, and that this also applies for the further separate flow duct 8 explained in the following and running in the axial direction.

Figure 2:
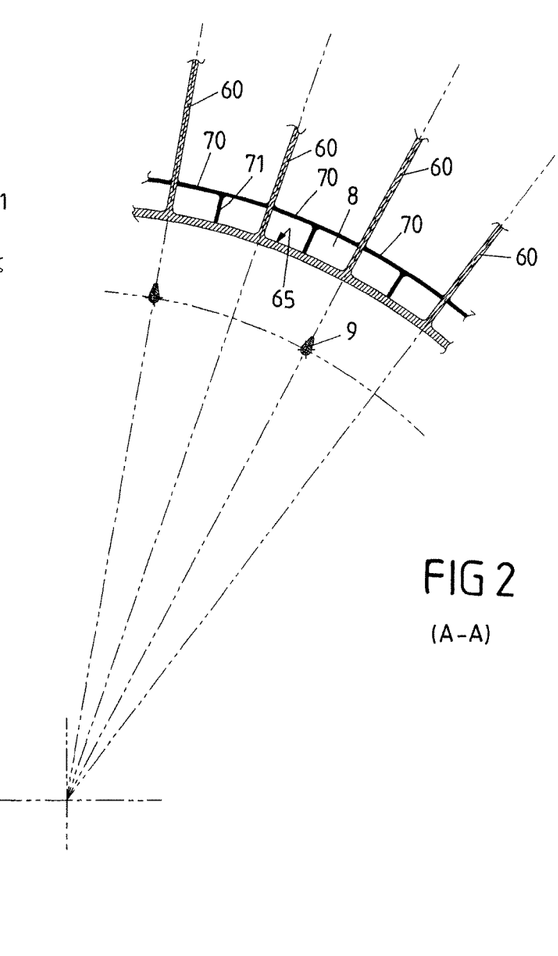
FIG. 2 shows a sectional view through the device of FIG. 1 along line A-A.

The flow duct 8 is formed by an annular space extending between the hub surface 65 of the hub 62 of the fan stator 6 and a cover 7. The cover 7 includes, as shown in FIG. 2, a plurality of cover panels 70 at a distance from the hub surface 65 in the radial direction. Each cover panel 70 extends here in the circumferential direction between two stator vanes 60 of the fan stator 6. According to FIG. 2, the cover panels 70 each include a supporting web 71 extending perpendicularly in the direction of the hub surface 65 and braced against the latter, with the cover panels 70 being designed with T-shaped cross-section.

The annular space 8, which is delimited radially inwards by the hub surface 65 and radially outwards by the cover 7, forms a flow duct directly adjoining the hub surface 65 and subdivided into individual partial ducts in the circumferential direction by the stator vanes 60. The flow duct 8 ends in the axial direction downstream of the stator vanes 60. Its axially rear end 78 is here at a distance downstream from the trailing edge of the stator vane 60, which is at least 30% and in particular at least 60% of the length of the profile chord of the stator vanes 60 of the fan stator 6. The profile chord here refers to the distance between the leading edge and the trailing edge of a stator vane 60. Generally speaking, however, it is also possible for the separate flow duct 8 to end directly at the trailing edge of the stator vane 60 or even upstream of it.

It can be seen from FIG. 1 that the separate flow duct 8 has at its axially rear end, when seen in the flow direction, an additional structure provided by a chute 14 or similar and extending beyond the axially rear edge 78 of the cover panels 70. This structure 14 thus forms in the axial direction a portion that projects relative to the panels 70. This structure has in its projecting portion a curvature in the direction of the secondary flow duct 2. At the same time, it runs out at its end 141 tangentially to the flow direction in the secondary flow duct 2.

The mode of operation of the described device is as follows. Compressor air is released, if engine operation requires this, out of the low-pressure compressor 20 via the release opening 12 and flows, guided by the chutes 15, radially outwards into the radial air guiding device 9 and into the flow duct 90 formed by the latter. The air is introduced through the radial flow duct 90 into the secondary flow duct 2, with the compressor air however not mixing with the air in the secondary flow duct 2, but being diverted in the direction of the axially extending and separate flow duct 8. Inside the flow duct 8, the compressor air is guided in the axial direction past the stator vanes 60 of the fan stator 6 and only mixed with the air of the secondary flow duct 2 downstream of the fan stator 6. This mixing is achieved while preventing aerodynamic losses by the fact that the compressor air is supplied by means of the chute 14 as tangentially as possible to the airflow inside the secondary flow duct 2.

Figure 3:
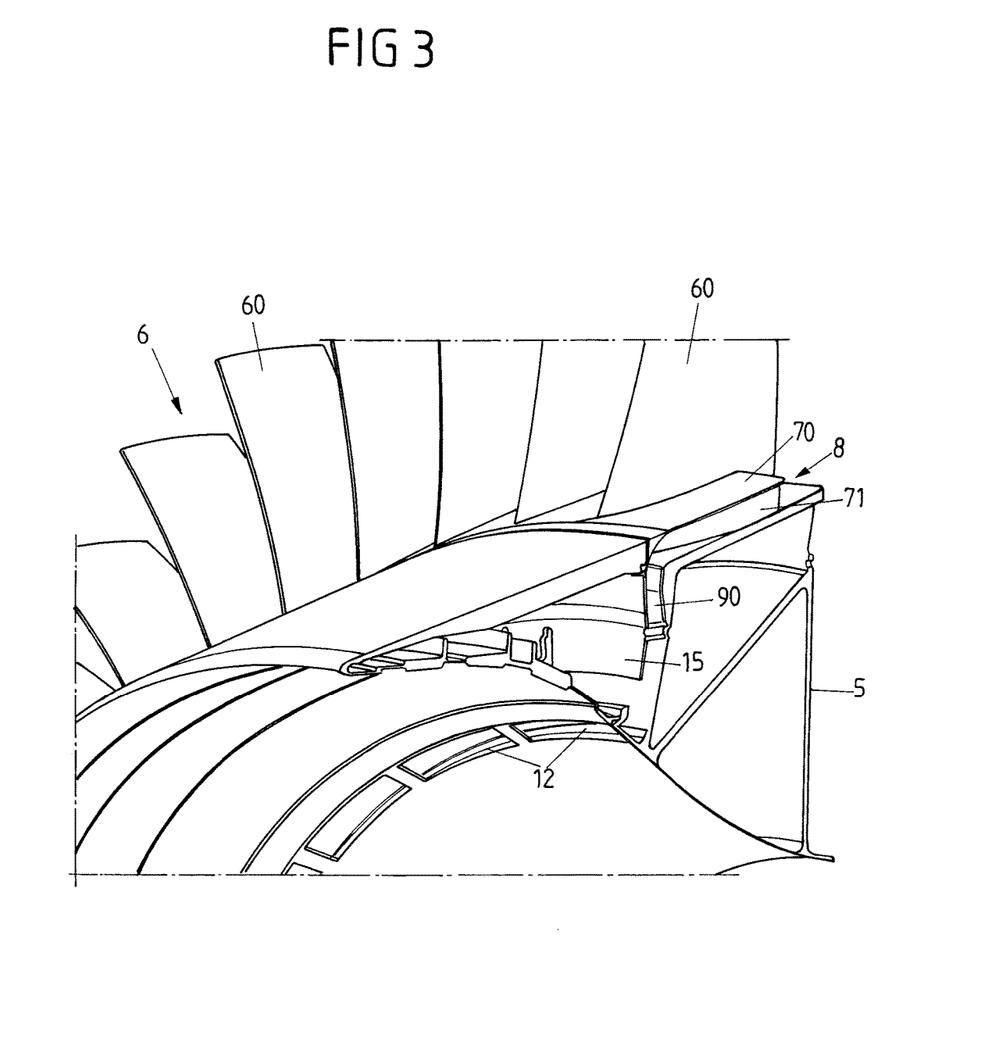
FIG. 3 shows a perspective representation of components of a turbofan engine, illustrating a fan stator and a device for bleeding compressor air having a separate flow duct for discharged compressor air formed by cover panels.
Figure 4:
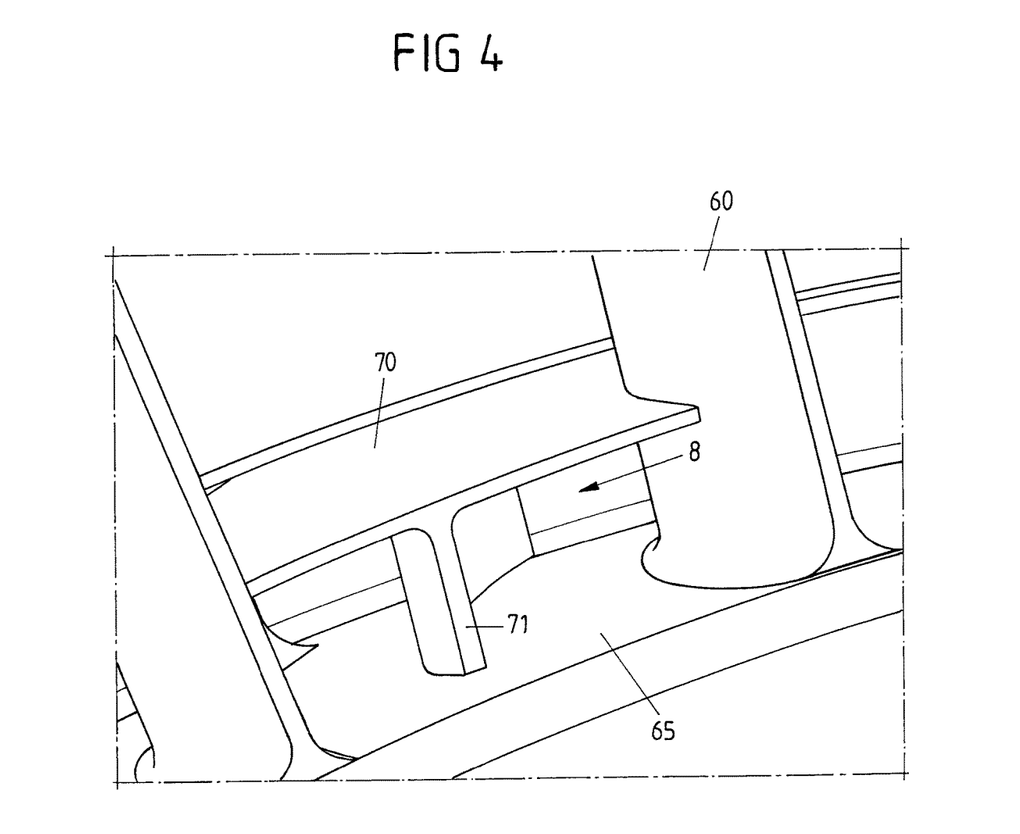
FIG. 4 shows a perspective representation when viewed against the flow direction into a flow duct for compressor air, said duct being radially delimited by cover panels and the hub surface of a fan stator and subdivided in the circumferential direction by stator vanes.
Figure 5:
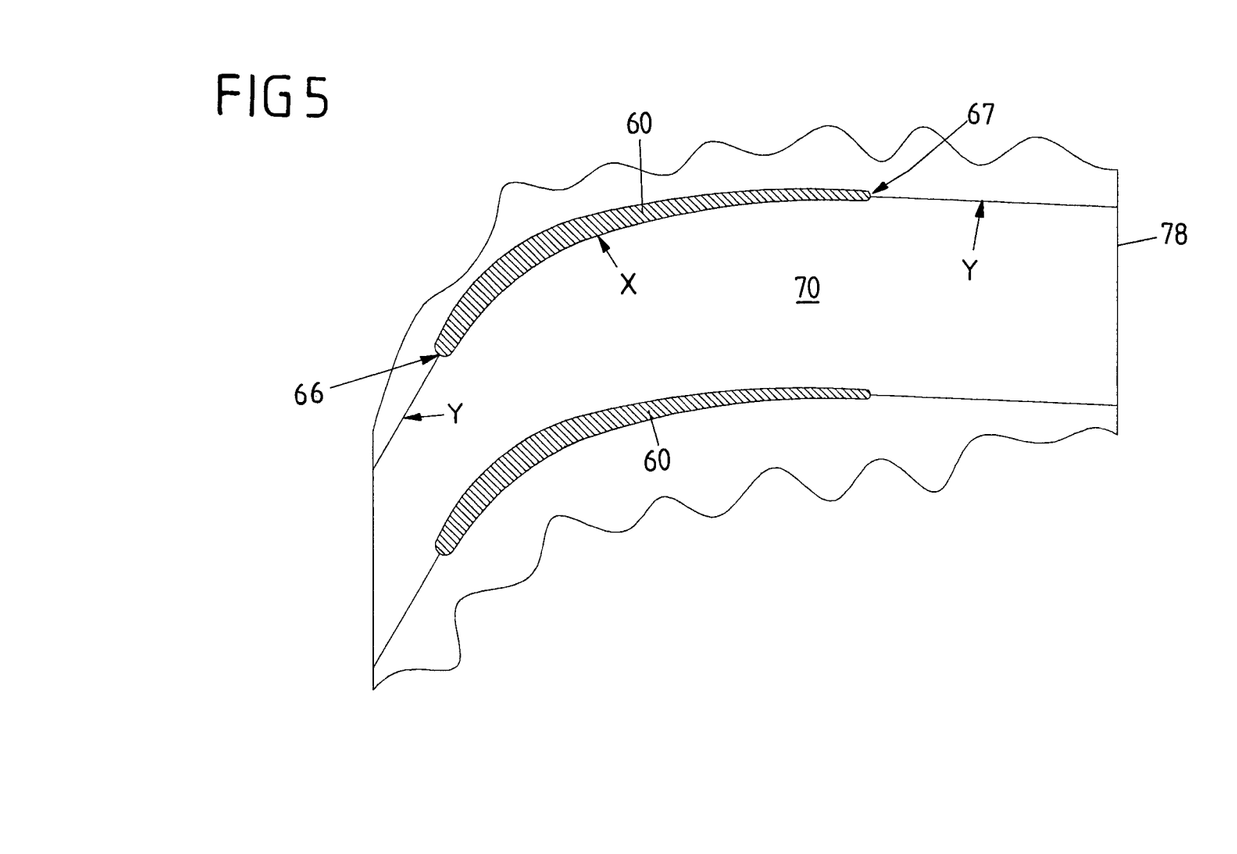
FIG. 5 shows in a view from above two stator vanes of a fan stator adjacently arranged in the circumferential direction and a cover panel provided between said stator vanes.

FIGS. 3, 4 and 5 show details of the described device. For example, FIG. 3 shows in a perspective view the release opening 12 in the wall of the low-pressure compressor, the chutes 15 for radial guidance of the compressor air, the radial flow duct 90 and the separate flow duct 8 formed between two each stator vanes by means of a cover panel 78 with supporting web 71.

FIG. 4 shows a perspective representation of the components forming the axial flow duct 8 when looking in the axial direction and against the flow direction. It can be discerned how the flow duct 8 is delimited radially inwards by the hub surface 65 and radially outwards by the cover panels 70, and how it is subdivided in the circumferential direction in each case by the stator vanes 60.

FIG. 5 shows in a view from above a cover panel 70 arranged between two stator vanes 60 and designed according to FIGS. 1 to 4. It can be seen here that the cover panel 70 not only extends in the circumferential direction between two stator vanes 60, but also begins in the axial direction upstream of the respective leading edge 66 of a stator vane 60 and ends downstream of the trailing edge 67 of the stator vane 60. Accordingly, the length of the flow duct 8 exceeds the axial depth of the stator vanes 60. As already mentioned, the axially rear end 78 of a cover panel 70 is in a preferred embodiment at a distance of at least 60% of the length of the profile chord downstream of the axial trailing edge 67 of the stator vane, where however smaller distances of for example at least 30% or only at least 10% of said reference length are also possible.

It is furthermore pointed out that the individual cover panels 70 are designed such that they seal the flow duct 8 as air-tight as possible from the air in the secondary flow duct 2. To do so, they provide a good seal from the adjoining vane profile (area X of FIG. 5) and a good seal from adjacent cover panels (areas Y of FIG. 5). Also, they are adapted to the shape of the vane profiles of the stator vanes 60 such that they also provide complete sealing in the area of the leading edge 66 and the trailing edge 67 of a stator vane 60.

Figure 6:
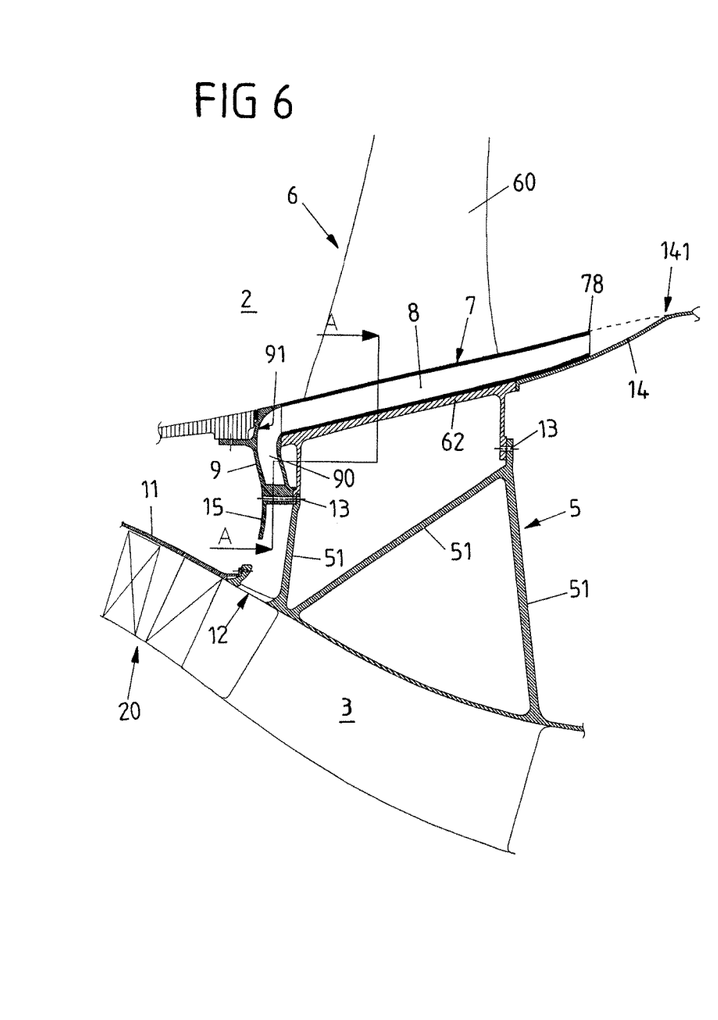
FIG. 6 shows a second exemplary embodiment of a device for bleeding compressor air, with a separate flow duct for the compressor air being provided in a secondary flow duct.

FIG. 6 shows an alternative exemplary embodiment of a device for bleeding compressor air in a turbofan engine. The embodiment shown in FIG. 6 differs from the exemplary embodiment in FIGS. 1 to 5 only in the way the axially extending flow duct 8 is formed, so that in respect of the other components of this device reference is made to the previous embodiments. As can be seen in particular in the sectional view in FIG. 7, the flow duct 8 is in this alternative exemplary embodiment formed by hollow structures 75 having a closed circumference in their cross-section, i.e. are of tube-like design. Each individual hollow structure 75 here extends between two adjacent stator vanes 60. The hollow structures form individual ducts which overall form the annular flow duct 8. In this exemplary embodiment too, the compressor air is guided inside the secondary flow duct in a separate flow duct 8 directly adjoining the hub 62 of the fan stator 6.

Figure 7:
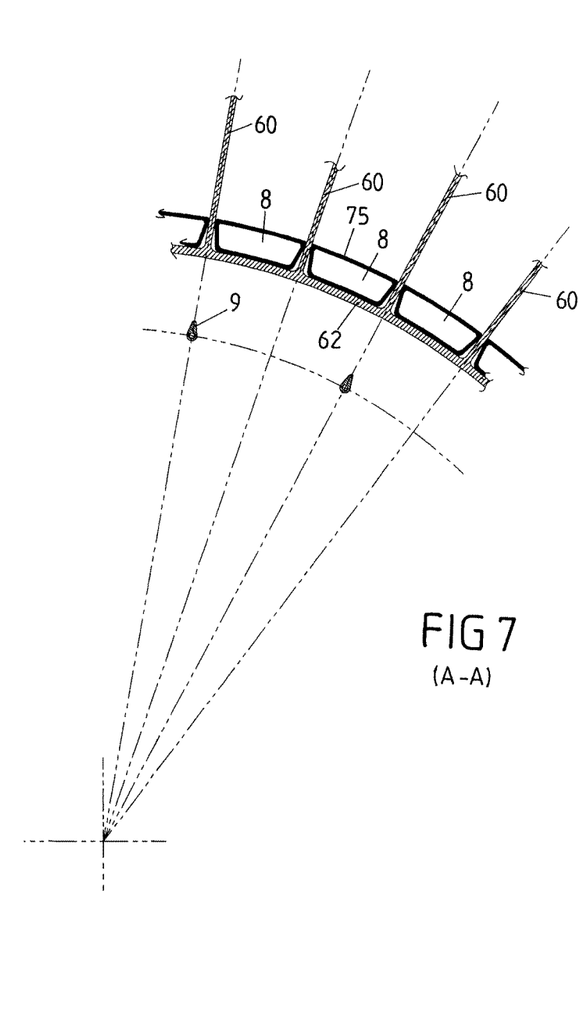
FIG. 7 shows a sectional view through the device of FIG. 6 along line A-A.

It is pointed out that in the exemplary embodiment of FIGS. 6 and 7 too, an additional chute 14 can be provided which has the effect that the compressor air is blown into the secondary flow duct 2 at a small angle relative to the axial flow direction, i.e. as tangentially as possible.

Figure 8:
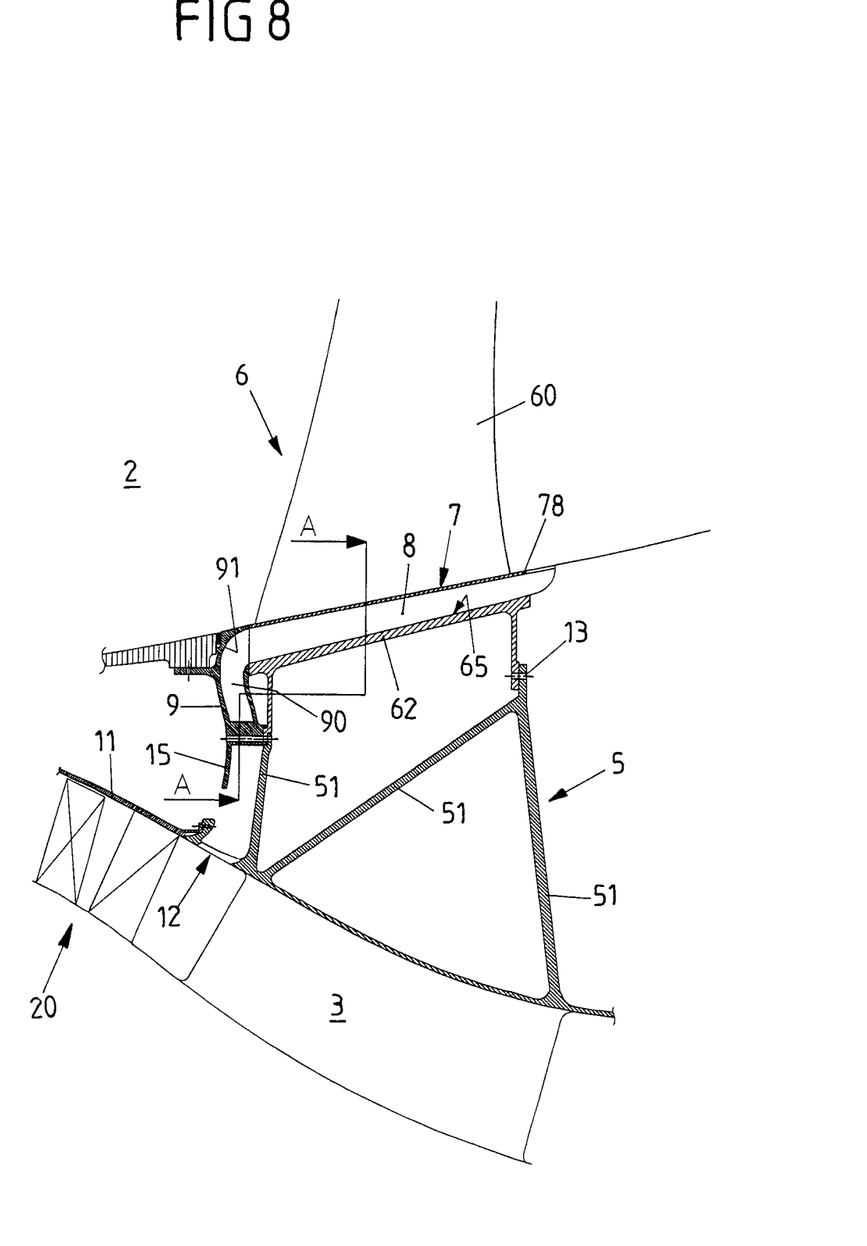
FIG. 8 shows a third exemplary embodiment of a device for bleeding compressor air, with a separate flow duct for the compressor air being provided in a secondary flow duct.

FIG. 8 shows a further alternative exemplary embodiment of a device for bleeding compressor air in a turbofan engine. This exemplary embodiment differs from the exemplary embodiment of FIG. 6 only in the length formed by the flow duct 8 downstream of the trailing edge of the stator vanes 60. As can be seen in FIG. 8, the flow duct 8 ends directly downstream of the stator vane 60.

In further exemplary embodiments, not shown, it can also be provided that the axially rear end of the flow duct 8 is still upstream of the trailing edge of the stator vanes 60, for example at a distance of 10 to 20% relative to the length of the profile chord of the stator vanes.

The cover panels of FIGS. 1 to 5 and 8, and the hollow structures of FIGS. 6 and 7, can generally speaking be formed from any material, for example by metal sheets. In an advantageous embodiment, it is provided that the cover panels or hollow structures are made of plastic and to do so are made for example using an injection molding method.

For secure fastening of the cover panels 70 or hollow structures 75, they are for example bolted or glued to adjacent casing components or other structural components.

The invention in its design is not restricted to the above mentioned exemplary embodiments, which are only to be understood as examples. Air guiding devices can also be provided in a manner other than that shown and have the effect that compressor air is guided upstream of the fan stator into the secondary flow duct and there guided into a separate flow duct in the axial direction and past the stator vanes of the fan stator, only being mixed with the air of the secondary flow duct downstream of the fan stator. Also, the embodiments shown must be understood only as examples in respect of size ratios and specific structural solutions.

What is claimed is:

1. A device for bleeding compressor air in a turbofan engine, comprising:
   a primary flow duct,
   a secondary flow duct,
   a low-pressure compressor positioned in the primary flow duct,
   a fan stator arranged in the secondary flow duct downstream of a fan in a flow direction, the fan stator including stator vanes positioned around a circumference of the fan stator,
   an arrangement by which compressor air to be discharged from the low-pressure compressor is introducible into the secondary flow duct,
   with the arrangement including an air guiding flow duct into which the compressor air is guided upstream of the fan stator relative to the flow direction in the secondary flow duct, and is there guided past the stator vanes in a separate flow duct in an axial direction and is only mixed with air of the secondary flow duct downstream of the fan stator,
   the separate flow duct being formed by a plurality of separate hollow structures extending in a longitudinal direction each between two adjacent stator vanes, with the hollow structures each having a closed circumference in cross-section to form an individual tube duct positioned adjacent both a hub of the fan stator and the two adjacent stator vanes, the individual tube duct having two side walls separate from and positioned between the two adjacent stator vanes, and a radially inner wall separate from and positioned radially outwardly from the hub, the two side walls and radially inner wall together forming a portion of the closed circumference, the individual tube duct being fastened to an adjacent engine component.

2. The device in accordance with claim 1, wherein the fan stator includes a hub with a hub surface that delimits the secondary flow duct radially inwards and the separate flow duct at least in some sections is provided adjoining or adjacent to the hub surface in the secondary flow duct.

3. The device in accordance with claim 2, wherein the separate flow duct includes a cover with a plurality of covering panels arranged at a radial distance to the hub surface, with the hub surface forming a radially inner limitation and the covering panels forming a radially outer limitation of the separate flow duct.

4. The device in accordance with claim 3, wherein the covering panels in the circumferential direction include an extension such that they extend each between two adjacent stator vanes of the fan stator, with the two adjacent stator vanes providing a subdivision of the separate flow duct into partial ducts in a circumferential direction.

5. The device in accordance with claim 3, wherein the covering panels each include a supporting web extending perpendicularly in a direction of the hub surface and braced against the hub surface.

6. The device in accordance with claim 1, wherein the separate flow duct forms a separated annular space within the secondary flow duct.

7. The device in accordance with claim 1, wherein the closed hollow structures are rectangular in cross-section.

8. The device in accordance with claim 1, wherein the separate flow duct extends in the axial direction over a length such that an axially rear end of the separate flow duct ends at a distance of at least 10% of a profile chord length of one of the stator vanes downstream of an axial trailing edge of the one of the stator vanes.

9. The device in accordance with claim 1, wherein the separate flow duct is prolonged at an axially rear end of the separate flow duct such that the compressor air is blown into the secondary flow duct at a small angle relative to the axial direction of flow inside the secondary flow duct.

10. The device in accordance with claim 9, wherein a radially inner limitation of the separate flow duct extends downstream of the fan stator in the axial direction further than a radially outer limitation of the separate flow duct, with a protruding portion of the radially inner limitation having a curvature in a direction of the secondary flow duct and at an end of the protruding portion running out tangentially to the axial direction of flow in the secondary flow duct.

11. The device in accordance with claim 1, wherein the fan stator is arranged on an exterior of an intermediate casing of the turbofan engine, and the intermediate casing absorbs structural loads.

12. The device in accordance with claim 1, wherein the fan stator supports structural loads.

13. The device in accordance with claim 1, and further comprising additional struts arranged in the secondary flow duct downstream of the fan stator in the flow direction for supporting, in combination with the fan stator, structural loads.

14. The device in accordance with claim 1, wherein the air guiding flow duct guides the compressor air in a radial direction upstream of the fan stator.

15. A turbofan engine with a device in accordance with claim 1.

16. The device in accordance with claim 1, wherein the separate flow duct extends in the axial direction over a length such that an axially rear end of the separate flow duct ends at a distance of at least 30% of a profile chord length of one of the stator vanes downstream of an axial trailing edge of the one of the stator vanes.

17. The device in accordance with claim 1, wherein the separate flow duct extends in the axial direction over a length such that an axially rear end of the separate flow duct ends at a distance of at least 60% of a profile chord length of one of the stator vanes downstream of an axial trailing edge of the one of the stator vanes.

18. The device in accordance with claim 1, wherein the separate hollow structures are fastened to separate casing or other components of the device.

* * * * *